(12) United States Patent
Hagano

(10) Patent No.: US 7,780,032 B2
(45) Date of Patent: Aug. 24, 2010

(54) FUEL CAP

(75) Inventor: Hiroyuki Hagano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 893 days.

(21) Appl. No.: 11/212,098

(22) Filed: Aug. 26, 2005

(65) Prior Publication Data

US 2006/0054623 A1 Mar. 16, 2006

(30) Foreign Application Priority Data

Aug. 30, 2004 (JP) ............................. 2004-250211

(51) Int. Cl.
*B65D 41/04* (2006.01)
(52) U.S. Cl. .................. 220/288; 220/232; 220/253; 220/293; 220/301; 220/304
(58) Field of Classification Search .......... 220/253, 220/288, 293, 301, 304, 232, DIG. 33
See application file for complete search history.

(56) References Cited

U.S. PATENT DOCUMENTS

| 5,992,669 | A | 11/1999 | Hagano et al. |
| 6,367,644 | B1 | 4/2002 | Reutter |
| 2005/0051555 | A1 | 3/2005 | Scherrer |

FOREIGN PATENT DOCUMENTS

| DE | 197 53 592 A1 | 6/1999 |
| DE | 203 13 900 U1 | 12/2003 |
| DE | 698 15 194 T2 | 5/2004 |
| EP | 0 869 024 A2 | 10/1998 |
| JP | A-63-162469 | 7/1988 |
| JP | A-10-278958 | 10/1998 |
| JP | A-2002-347454 | 12/2002 |

OTHER PUBLICATIONS

Office Letter issued from the German Patent Office and received on Mar. 5, 2009 in the corresponding German patent application No. 10 2005 040 898.2-25 (English translation).
Office Action issued from the Japanese Patent Office mailed on Mar. 10, 2009 in the corresponding Japanese patent application No. 2004-250211.

*Primary Examiner*—Anthony Stashick
*Assistant Examiner*—Elizabeth Volz
(74) *Attorney, Agent, or Firm*—Posz Law Group, PLC

(57) ABSTRACT

A fuel cap of the invention has a pressure regulating valve, which includes a positive pressure valve and a negative pressure valve. The positive pressure valve has a positive pressure valve plug and a first spring, whereas the negative pressure valve has a negative pressure valve plug and a second spring. A valve support member is located in the upstream of the negative pressure valve to support the positive pressure valve plug. A tubular body is integrally formed with the valve support member. The tubular body eliminates the turbulence of the inflow of the air current and leads the laminar air flow into the negative pressure valve in its open position. This arrangement of the invention effectively increases the maximum flow rate of the negative pressure valve in the open position.

5 Claims, 4 Drawing Sheets

FUEL CAP

This application claims the benefit of and priority from Japanese Application No. 2004-250211 filed Aug. 30, 2004, the content of which is incorporated herein by reference.

BACKGROUND OF THE INVENTION

1. Field of the Invention

The present invention relates to a fuel cap having a pressure regulating valve to regulate the inner pressure of a fuel tank, and more specifically to a mechanism of improving the flow rate characteristics of the pressure regulating valve.

2. Description of the Related Art

A known fuel cap has a cap main body screwed to an inlet of a fuel tank, and a pressure regulating valve received in to the cap main body to regulate the inner pressure of the fuel tank (see, for example, JP-A-10-278958 and 2002-347454). The pressure regulating valve includes a positive pressure valve and a negative pressure valve. The positive pressure valve opens when the inner pressure of the fuel tank rises over a preset positive pressure level. The negative pressure valve opens when the inner pressure of the fuel tank lowers below a preset negative pressure level. The pressure regulating valve accordingly regulates the inner pressure of the fuel tank in a preset pressure range.

The increased negative pressure has a high potential for damage of the fuel tank. The negative pressure valve is thus required to quickly open under the negative pressure condition and make a high flow rate of the outside air for cancellation of the negative pressure condition in the fuel tank.

SUMMARY OF THE INVENTION

An advantage of some aspects of the invention is to provide a fuel cap equipped with a pressure regulating valve that quickly leads a high flow rate of the outside air in its open position of the negative pressure valve.

In order to attain at least part of the above and the other related objects, the present invention is directed to a fuel cap, which includes a cap main body that is attached to a tank opening of a fuel tank, and a pressure regulating valve that is received in the cap main body and opens and closes an inner-cap flow path formed inside the cap main body to regulate an inner pressure of the fuel tank.

The pressure regulating valve includes a positive pressure valve that opens when the inner pressure of the fuel tank rises over preset positive pressure level, a negative pressure valve that opens when the inner pressure of the fuel tank lowers below a preset negative pressure level, and a flow path formation member that leads an air flow into the negative pressure valve in an open position of the negative pressure valve.

The positive pressure valve has a positive pressure valve plug that opens and closes a first valve flow path as part of the inner-cap flow path, and a second valve flow path that is formed through the positive pressure valve plug as part of the inner-cap flow path.

The negative pressure valve has a negative pressure valve plug that opens and closes the second valve flow path.

In the fuel cap of the invention, the pressure regulating valve opens and closes the inner-cap flow path to regulate the inner pressure of the fuel tank in a preset pressure range. The positive pressure valve plug of the positive pressure valve opens when the inner pressure of the fuel tank rises above the preset positive pressure level. The negative pressure valve plug of the negative pressure valve opens when the inner pressure of the fuel tank lowers below the preset negative pressure level. Such regulation keeps the inner pressure of the fuel tank in the preset pressure range. The flow path formation member located in the upstream of the negative pressure valve effectively reduces the turbulence of the air flow into the negative pressure valve, thus increasing the flow rate of the air flow into the negative pressure valve in its open position and promptly canceling the negative pressure condition in the fuel tank.

In one preferable embodiment of the fuel cap of the invention, the positive pressure valve includes a first spring that has one end supported by a support member provided on the cap main body and the other end applying a pressing force to the positive pressure valve plug in a closing direction. The positive pressure valve plug has a seating element that is arranged to face the first valve flow path and is seated on a first seat element provided on the cap main body to close the first valve flow path, and a second seat element that is arranged to face the second valve flow path.

In this preferable structure, the negative pressure valve has a second spring that applies a pressing force to the negative pressure valve plug in a closing direction.

The flow path formation member may be a tubular body formed integrally with a valve support member supporting the positive pressure valve plug, may be a tubular body formed integrally with an inner cover supporting the other end of the first spring, or may be a tubular body formed integrally with the positive pressure valve plug.

In any of the above structures, the first spring may be a coil spring, and the flow path formation member may be arranged to go through an inner space of the first spring.

DESCRIPTION OF THE PREFERRED EMBODIMENTS (1) General Structure of Fuel Cap 10

Figure 1:
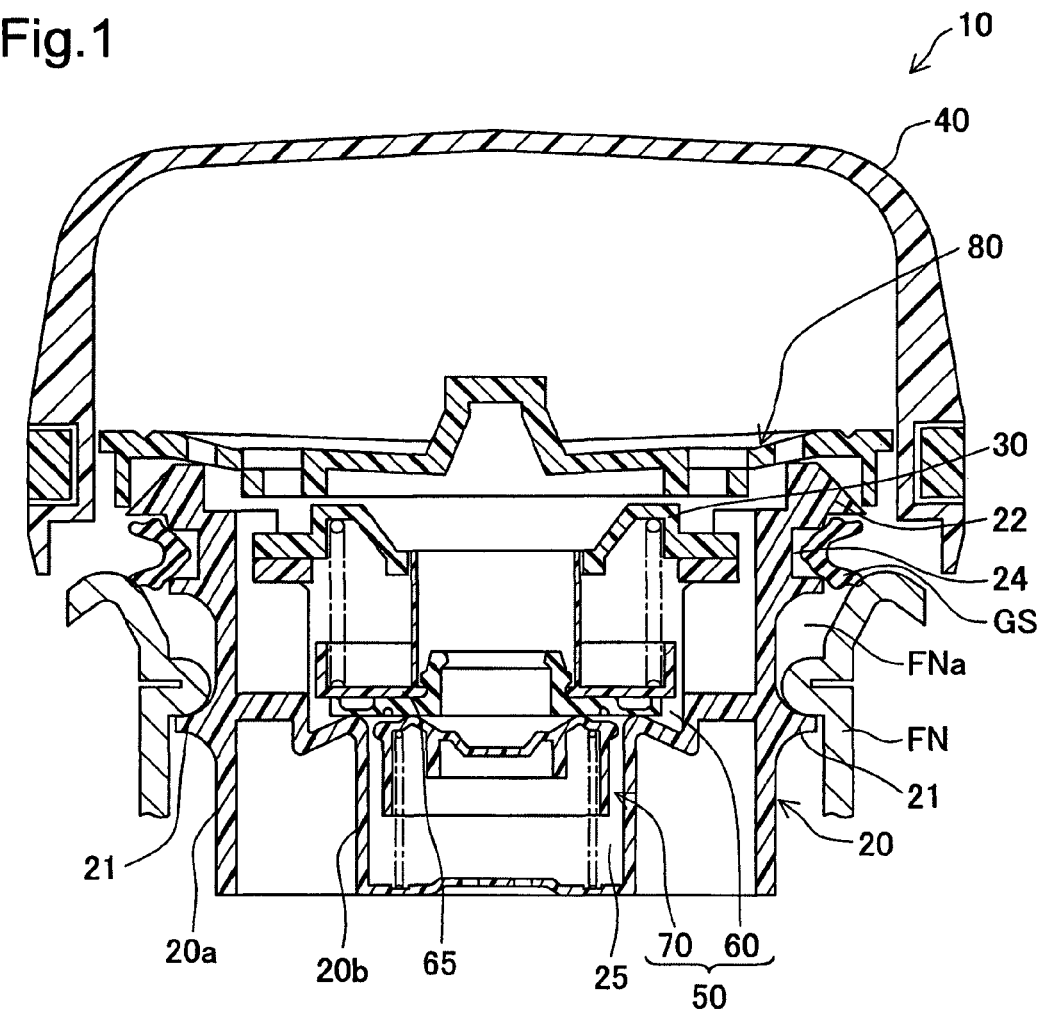
FIG. 1 is a sectional view illustrating the structure of a fuel cap in an embodiment of the invention.

FIG. 1 is a sectional view illustrating the structure of a fuel cap 10 in one embodiment of the invention. As illustrated in FIG. 1, the fuel cap 10 is attached to a filler neck FN having an inlet FNa (tank opening) to feed a supply of fuel to a fuel tank (not shown). The fuel cap 10 has a cap main body 20 that is made of a synthetic resin material like polyacetal, a cover 40 that is mounted on the cap main body 20 and has a handle made of a synthetic resin material like nylon, an inner cover 30 (support member) that closes an upper opening of the cap main body 20 and forms a valve chest 25, a pressure regulating valve 50 that is received in the valve chest 25, a torque mechanism 80, and a gasket GS that is attached to the upper outer circumference of the cap main body 20 to seal the cap main body 20 from the filler neck FN.

The cap main body 20 has a substantially cylindrical outer tubular member 20a with a cap engagement element 21, which engages with an inner circumferential element of the filler neck FN, and a valve chest formation member 20b that is arranged inside the outer tubular member 20a to be extended from the bottom of the outer tubular member 20a and form the valve chest 25. The valve chest formation member 20b and the upper portion of the outer tubular member 20a are covered with the inner cover 30 attached to the upper portion of the cap main body 20 to define the valve chest 25. The pressure regulating valve 50 received in the valve chest 25 includes a positive pressure valve 60 and a negative pressure valve 70 and regulates the inner pressure of the fuel tank in a predetermined range.

The gasket GS is set on a lower face of an upper flange 22 of the cap main body 20. The gasket GS is located between a seal support element 24 of the flange 22 and the inlet FNa of the filler neck FN. When the fuel cap 10 is inserted into the inlet FNa, the gasket GS is pressed against the seal support element 24 to exert the sealing effects. The torque mechanism 80 clicks when the rotational torque applied in a closing operation of the fuel cap 10 exceeds a preset level. The user can thus confirm that the fuel cap 10 is closed with the rotational torque of or over the preset level.

(2) Structure of Pressure Regulating Valve 50

Figure 2:
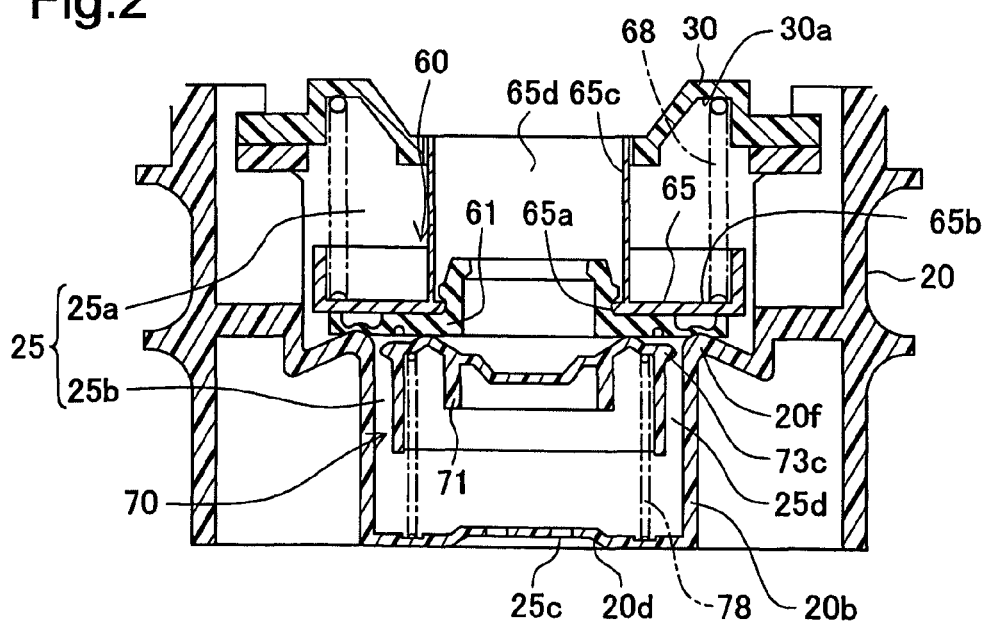
FIG. 2 is an enlarged sectional view schematically illustrating the structure of a pressure regulating valve included in the fuel cap of FIG. 1.

FIG. 2 is an enlarged sectional view schematically illustrating the structure of the pressure regulating valve 50. The pressure regulating valve 50 includes the positive pressure valve 60 and the negative pressure valve 70. The positive pressure valve 60 is located in an upper chamber 25a of the valve chest 25, whereas the negative pressure valve 70 is located in a lower chamber 25b of the valve chest 25. A first seat element 20f is formed between the upper chamber 25a and the lower chamber 25b and is inclined from the inside of the valve chest formation member 20b. A first valve flow path 25d is formed to face the first seat element 20f. The first valve flow path 25d communicates with a connection hole 25c formed in a bottom 20d. The connection hole 25c is connected to the fuel tank through a filler pipe (not shown).

(2)-1 Structure of Positive Pressure Valve 60

The positive pressure valve 60 includes a positive pressure valve plug 61 to open and close the first valve flow path 25d, a valve support member 65, and a first spring 68 that is fixed on one end thereof to the inner cover 30 and applies the pressing force to the positive pressure valve plug 61 in a closing direction via the valve support member 65.

Figure 3:
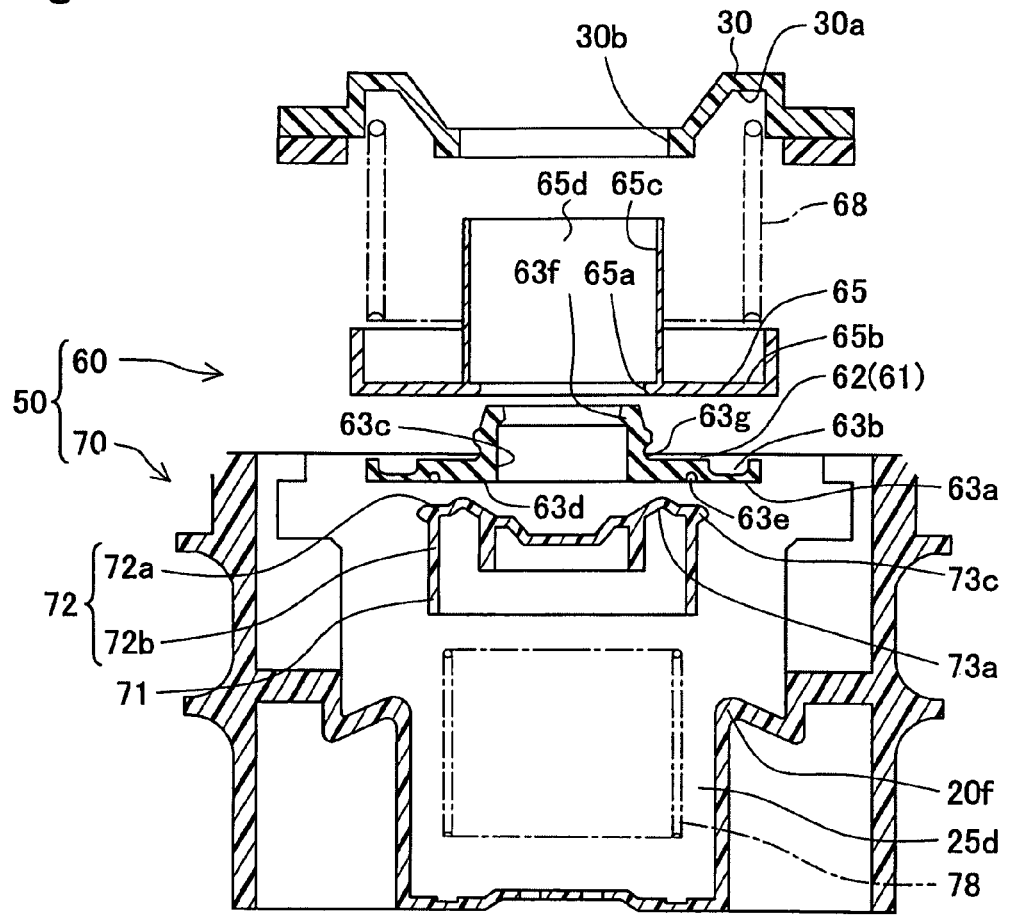
FIG. 3 is a decomposed sectional view of the pressure regulating valve.

FIG. 3 is a decomposed sectional view of the pressure regulating valve 50. The positive pressure valve plug 61 has a positive pressure valve disc 62 that is made of, for example, fluorocarbon rubber and has a through hole and a projection to exert the valve functions. The positive pressure valve disc 62 has a seating element 63a that is seated on the first seat element 20f to close the first valve flow path 25d. The seating element 63a has a thinner-wall portion formed as a circular recess 63b around the outer circumference on the top face of the positive pressure valve disc 62. The seating element 63 is bent and deflected to enhance the sealing property, when being seated on the first seat element 20f. A second valve flow path 63c connecting with the first valve flow path 25d is formed through the center of the positive pressure valve disc 62. A lower face of the positive pressure valve disc 62 faces the second valve flow path 63c and forms a second seat element 63d. The second seat element 63d works as a seat face of the negative pressure valve 70 as described later. A circular groove 63e is formed around the inner circumference of the circular recess 63b on the bottom face of the positive pressure valve disc 62. The circular groove 63e enhances flexibility and deflection of the positive pressure valve plug 61 in a closed position.

A substantially tubular fitting element 63f, or cylindrical projection, is formed upright on the center of the positive pressure valve plug 61 to surround the second valve flow path 63c. A side support recess 63g is formed on the side of the fitting element 63f. The positive pressure valve plug 61 is joined with the valve support member 65 by fitting the side support recess 63g in a fitting hole 65a of the valve support member 65. A spring support element 65b is located on the top face of the valve support member 65 to support one end of the first spring 68. The other end of the first spring 68 is supported by a cylindrical support element 30a of the inner cover 30. The first spring 68 is accordingly held between the spring support element 65b and the inner cover 30.

A tubular body 65c (flow path formation member) is protruded from the top face of the valve support member 65. The tubular body 65c is extended into a through hole 30b of the inner cover 30 and forms a flow passage 65d inside thereof. The outside air is flown into the negative pressure valve 70 through the flow passage 65d and the second valve flow path 63c.

(2)-2 Structure of Negative Pressure Valve 70

As shown in FIG. 2, the negative pressure valve 70 includes a negative pressure valve plug 71 that is made of a resin, and a second spring 78 that is held between the negative pressure valve plug 71 and the bottom 20d and presses the negative pressure valve plug 71.

Referring to FIG. 3, the negative pressure valve plug 71 has a cup-shaped negative pressure valve element 72 including an upper wall element 72a and a cylindrical side wall 72b extended from the outer circumference of the upper wall element 72a. The negative pressure valve element 72 has a protrusion to exert the valve functions. A circular seating ridge 73a is formed on the upper wall element 72a of the negative pressure valve element 72 to be seated on the second seat element 63d of the positive pressure valve plug 61 and thereby close the second valve flow path 63c. An upper end of the cylindrical side wall 72b faces the first valve flow path 25d and has a circular projection 73c. The circular projection 73c works as a restriction element to narrow the flow area of the first valve flow path 25d in a closed position of the negative pressure valve plug 71. In response to an open action of the positive pressure valve plug 61, the negative pressure valve plug 71 moves integrally with the positive pressure valve plug 61. The circular projection 73c widens the flow area of the first valve flow path 25d in this open position.

(3) Operations of Pressure Regulating Valve 50

Figure 4:
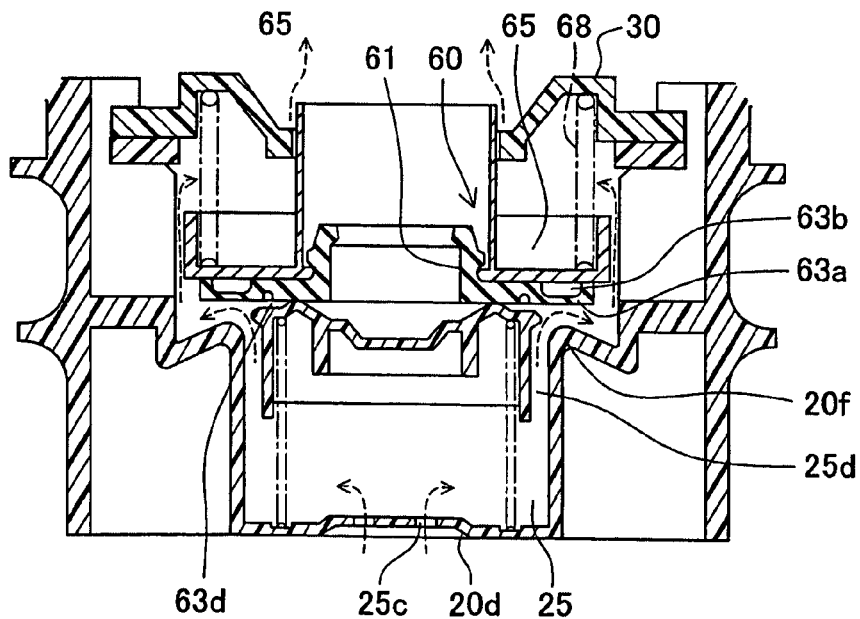
FIG. 4 shows an opening action under a positive pressure condition in the pressure regulating valve.

The positive pressure valve 60 configured as discussed above works to regulate the inner pressure of the fuel tank. In the state of attachment to the fuel cap 10 shown in FIGS. 1 and 2 to the filler neck FN, when the inner pressure of the fuel tank rises above a preset positive pressure level, the positive pressure valve plug 61 and the valve support member 65 move up against the pressing force of the first spring 68 as shown in FIG. 4. The inside of the fuel tank accordingly communicates with atmosphere (outside air) through the flow passage including the filler pipe, the connection hole 25c of the bottom 20d, the first valve flow path 25d, the outer circumferential gap of the positive pressure valve plug 61, and the through hole of the inner cover 30. Such communication cancels the positive pressure condition in the fuel tank. Communication of the inside of the fuel tank with the outside air decreases the differential pressure applied to the positive pressure valve plug 61 to be lower than the pressing force of the first spring 68. The pressing force of the first spring 68 then presses down and closes the positive pressure valve plug 61 as shown in FIG. 2. In this manner, the positive pressure valve plug 61 is opened and closed to prevent the inner pressure of the fuel tank from exceeding the first pressure level.

Figure 5:
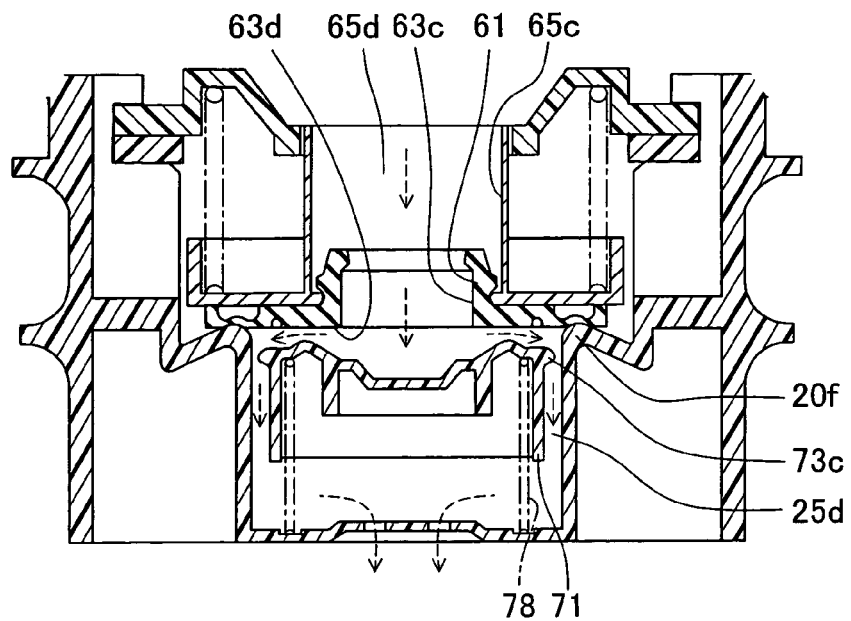
FIG. 5 shows an opening action under a negative pressure condition in the pressure regulating valve.

When the inner pressure of the fuel tank lowers below a preset negative pressure level, on the other hand, the negative pressure valve plug 71 moves down against the pressing force of the second spring 78 as shown in FIG. 5. The negative pressure valve plug 71 is released from the second seat element 63d of the positive pressure valve plug 61, while the positive pressure valve plug 61 is seated on the first seat element 20f. In order to keep this state, a flow pathway is formed between the negative pressure valve plug 71 and the positive pressure valve plug 61. The inside of the fuel tank then communicates with the outside air via the through hole 30b on the center of the inner cover 30, the flow passage 65d formed inside the tubular body 65c of the valve support member 65, the second valve flow path 63c, the first valve flow path 25d, and the connection hole 25c of the bottom 20d. Such communication cancels the negative pressure condition in the fuel tank. The negative pressure valve plug 71 is closed when the differential pressure applied to the negative pressure valve plug 71 becomes lower than the pressing force of the second spring 78. In this state, the tubular body 65c functioning as the flow path formation member makes a flow of the outside air through the flow passage 65d and leads the outside air to the periphery of the first spring 68. Namely the tubular body 65c prevents the turbulence or swirling of the air current and quickly leads the laminar air flow into the negative pressure valve 70, so as to increase the maximum flow rate in an open position of the negative pressure valve 70. This arrangement promptly cancels the negative pressure condition in the fuel tank and effectively protects the fuel tank from potential damages due to the inner negative pressure.

(4) Functions and Effects of Pressure Regulating Valve 50

Figure 6:
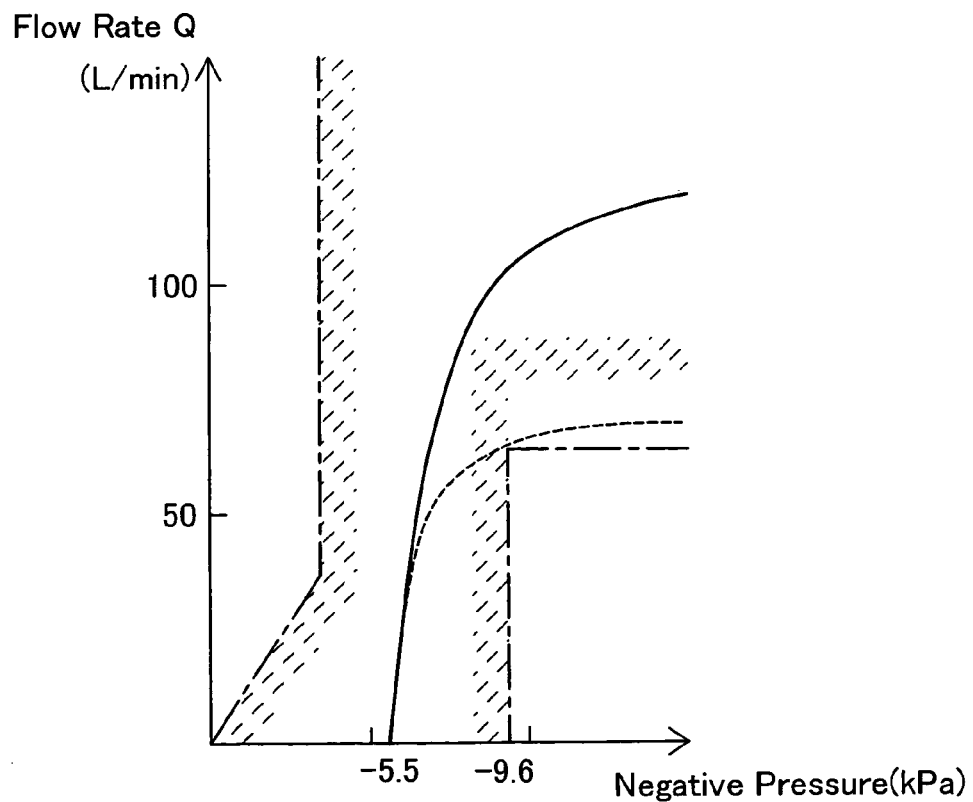
FIG. 6 is a graph showing a flow rate characteristic curve of a negative pressure valve.

The structure of the embodiment has various functions and effects discussed below:

(4)-1 The simple presence of the tubular body 65c integrated with the valve support member 65 desirably increases the flow rate of the negative pressure valve 70. FIG. 6 is a graph showing a flow rate characteristic curve of the negative pressure valve 70. In the graph of FIG. 6, an area surrounded by one-dot chain lines represents a range of desired flow rate characteristic of the negative pressure valve 70. A solid line curve represents the flow rate characteristic in the structure of the embodiment, while a broken line curve represents the flow rate characteristic in the conventional structure. As clearly shown in FIG. 6, the flow rate under a negative pressure of −9.6 kPa increased from 70 L/min in the conventional structure to 120 L/min in the structure of the embodiment. The tubular body 65c (flow path formation member) of the embodiment eliminates the turbulence of the air current flowed into the second valve flow path 63c in the open position of the negative pressure valve 70. Namely the tubular body 65c quickly leads the laminar air flow into the negative pressure valve 70 and thus effectively increases the flow rate of the negative pressure valve 70.

(4)-2 The tubular body 65c functioning as the flow path formation member is integrated with the valve support member 65. This arrangement does not undesirably increase the total number of parts and simplifies the structure.

(4)-3 The tubular body 65c is simply designed to connect with the second valve flow path 63c of the positive pressure valve plug 61 and does not require any additional space. The presence of the tubular body 65c does not expand the size of the fuel cap 10 but effectively increases the flow rate of the negative pressure valve 70.

The embodiment discussed above is to be considered in all aspects as illustrative and not restrictive. There may be many modifications, changes, and alterations without departing from the scope or spirit of the main characteristics of the present invention. Some examples of possible modification are given below.

Figure 7:
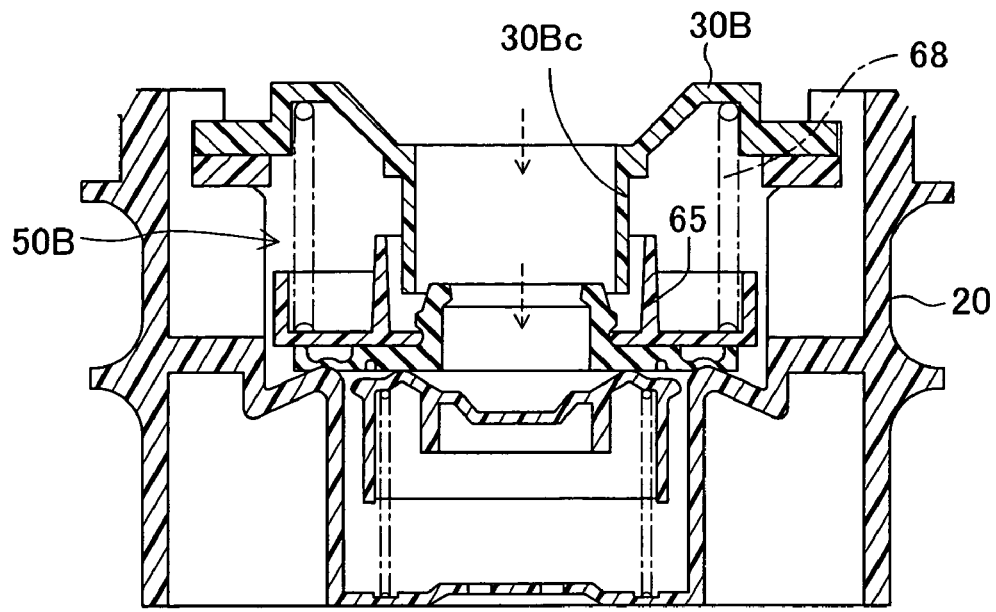
FIG. 7 is a sectional view showing the structure of another pressure regulating valve in one modified example.

(1) FIG. 7 is a sectional view illustrating the structure of another pressure regulating valve 50B in one modified example. The pressure regulating valve 50B of this modified example is characterized by a flow path formation member, which is formed as a tubular body 30Bc protruded from a bottom face of an inner cover 30B (support member). The tubular body 30Bc functioning as the flow path formation member leads the outside air with no turbulence into the negative pressure valve. This modified structure accordingly has the similar functions and effects to those of the structure of the embodiment shown in FIG. 1.

Figure 8:
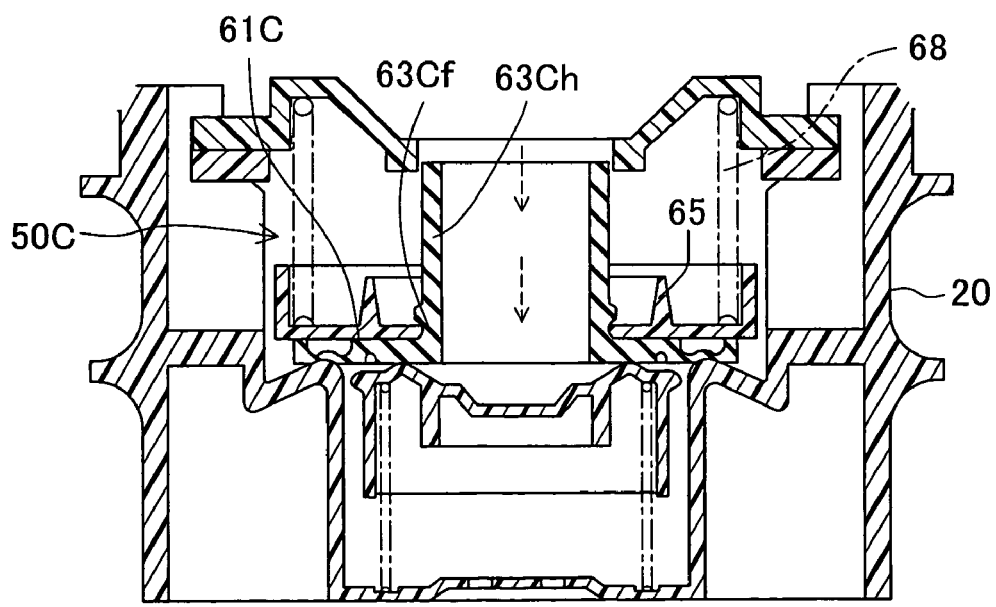
FIG. 8 is a sectional view illustrating the structure of still another pressure regulating valve in another modified example.

(2) FIG. 8 is a sectional view illustrating the structure of still another pressure regulating valve 50C in another modified example. The pressure regulating valve 50C of this modified example is characterized by a flow path formation member, which is formed as a tubular body 63Ch protruded from a top wall of a fitting element 63Cf of a positive pressure valve plug 61C. The tubular body 63Ch functioning as the flow path formation member leads the outside air with no turbulence into the negative pressure valve. This modified structure accordingly has the similar functions and effects to those of the structure of the embodiment shown in FIG. 1 and the modified structure shown in FIG. 7.

(3) In the embodiment and its modified examples described above, the flow path formation member is formed as a tubular body and is integrated with the valve support member, the inner cover, or the positive pressure valve plug. These structures are, however, not restrictive, and the flow path formation member may be formed as a separate member to be arranged in a flow path in the upstream of the negative pressure valve.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cap, comprising
a cap main body that is attached to a tank opening of a fuel tank; and
a pressure regulating valve that is received in the cap main body and opens and closes an inner-cap flow path formed in the cap main body to regulate an inner pressure of the fuel tank with respect to an outside space, wherein the pressure regulating valve includes
a positive pressure valve that opens when the inner pressure of the fuel tank rises above a preset positive pressure level, and
a negative pressure valve that opens when the inner pressure of the fuel tank falls below a preset negative pressure level, wherein:
the positive pressure valve includes:

a positive pressure valve plug that opens and closes a first valve flow path; and a cylindrical projection projecting from a center of the positive pressure valve plug with a second valve flow path;

the negative pressure valve includes a negative pressure valve plug that opens and closes the second valve flow path;

the first valve flow path is a path formed as part of the inner-cap flow path and is formed between a first seat element of an inner wall of the cap main body and the positive pressure valve plug, and the second valve flow path is formed as part of the inner-cap flow path, is formed through the cylindrical projection, and is opened and closed by the negative pressure valve plug;

the pressure regulating valve further includes:

an inner cover that is attached to the cap main body in a facing arrangement with the positive pressure valve plug, and the inner cover has a tubular body that protrudes from a center portion of the inner cover, wherein the tubular body has a path formed therethrough that connects the outside space with the second valve flow path; and a coil spring, a first end of which is supported by the inner cover, and a second end of which applies force to the positive pressure valve plug in a closing direction, wherein the first end of the coil spring is opposite to the second end of the coil spring, and wherein the tubular body is located inside the coil spring; and the tubular body extends to overlap an end of the cylindrical projection of the positive pressure valve plug parallel to a central axis of the cap, and the path of the tubular body connects the outside space with the second valve flow path and leads outside air into the second valve flow path in an open position of the negative pressure valve.

2. The fuel cap in accordance with claim 1, wherein the negative pressure valve includes a second spring that applies a pressing force to the negative pressure valve plug in a closing direction.

3. The fuel cap in accordance with claim 1, wherein the positive pressure valve includes a valve support member supporting the positive pressure valve plug.

4. The fuel cap in accordance with claim 1, wherein a distal end of the cylindrical projection is closer to the inner cover than a distal end of the tubular body.

5. The fuel cap in accordance with claim 1, wherein a radial line extending from the central axis of the cap and intersecting a distal end section of the cylindrical projection passes through a distal end section of the tubular body.

* * * * *